(12) United States Patent
Deves et al.

(10) Patent No.: US 6,915,862 B2
(45) Date of Patent: Jul. 12, 2005

(54) THREE POINT HITCH FOR UTILITY VEHICLE

(75) Inventors: Thomas J. Deves, Evans, GA (US); Nick Tzortzinis, Fredericksburg, VA (US); Preston Roberts, Toano, VA (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/389,237

(22) Filed: Mar. 14, 2003

(65) Prior Publication Data

US 2004/0188112 A1 Sep. 30, 2004

(51) Int. Cl.[7] .................. A01B 59/043; A01B 59/06; A01B 63/02; A01B 63/118
(52) U.S. Cl. .................. 172/448; 172/449; 172/450
(58) Field of Search .................. 172/439, 448–450, 172/605, 677, 679, 680, 684.5, 681, 776

(56) References Cited

U.S. PATENT DOCUMENTS

| | | |
|---|---|---|
| 4,304,303 A | 12/1981 | Lange |
| 4,709,941 A | 12/1987 | Obel et al. |
| 4,805,927 A | 2/1989 | Stephenson et al. |
| 4,906,039 A | 3/1990 | Broman |
| 6,347,671 B1 | 2/2002 | Stiller et al. |

*Primary Examiner*—Christopher J. Novosad
(74) *Attorney, Agent, or Firm*—The Law Office of Randall T. Erickson, P.C.

(57) ABSTRACT

A three point hitch for a cart-type utility vehicle wherein the utility vehicle comprises a vehicle frame that includes an axle housing and an upper frame cross member. The three point hitch comprises a pair of spaced apart lower draft links, each pivotally mounted to the axle housing and extending rearward, the lower draft links having connection features at free ends thereof for connecting to an implement. A beam extends in a lateral direction parallel to the upper frame cross member. A rockshaft extends parallel to the beam and is pivotally connected to the beam. A lift bracket is fixedly connected to the rockshaft. Two upper links are fixedly connected to the rockshaft and extend rearward, the upper links located above the lower draft links. Two vertical links connect the upper links and the lower draft links. Endplates are fixedly connected to the beam and are connected to the vehicle frame by pins that also are used to pivotally connect a cargo box or platform to the frame. A bracket assembly is configured to capture the upper frame cross member and brace against the beam. The bracket assembly extends to a cylinder connection below the rockshaft. A hydraulic cylinder is connected between the cylinder connection and the lift bracket. Expansion of the hydraulic cylinder rotates the rockshaft to lift the lower draft links.

20 Claims, 5 Drawing Sheets

THREE POINT HITCH FOR UTILITY VEHICLE

TECHNICAL FIELD OF THE INVENTION

The invention relates to three point hitches for utility vehicles. Particularly, the invention relates to a three point hitch assembly for a cart-type utility vehicle.

BACKGROUND OF THE INVENTION

Three point hitches for lawn and garden tractors are known. Utilization of three point hitches on lawn and garden tractors enables the operator greater control over the implements and also the ability to use larger implements.

A three point hitch for a lawn and garden tractor is described in U.S. Pat. No. 4,304,303. According to the patent, a three point hitch includes a first shaft rotatably mounted transverse to the frame of the tractor. A pair of lift arms are fixedly mounted on the first shaft. The lift arms are mounted generally perpendicular to the first shaft and in parallel spatial alignment on the shaft. Each lift arm has pivotally mounted to its most rearwardly projecting end a connecting link. The other end of each connecting link is pivotally mounted to a respective lower linking or hitch arms which is in turn pivotally mounted to the vehicle frame. Rotatably placed around each end of the first shaft is a lifting pillow in communication with a hydraulic cylinder. The lifting pillow is located beneath an associated lift arm to exert force thereon supplied by a corresponding hydraulic cylinder to cause the lift arm to be raised, thereby raising the respective lower hitch arm.

A second shaft is placed parallel to and beneath the first shaft. Spaced generally central along the first and second shafts are a plurality of cooperatively engaging linking members so arranged to allow a third or upper hitch arm to pivotally connect therewith.

Cart-type utility vehicles, such as John Deere GATOR® vehicles, are used for some maintenance activities. Compared to a lawn and garden tractor, cart-type vehicles typically have a higher top speed, can carry a passenger, and can carry cargo on a rear-located cargo box or platform. Such cart-type utility vehicles have been provided with hitches that allow attachment of three point hitch implements. Such implements include box blades, mowers, aerators and tillers. However, known hitches for cart-type utility vehicles lack full three point hitch functionality. The vehicle float capability, i.e., the differential vertical movement between the vehicle and the implement, has been less than desired in heretofore known hitches for cart-type vehicles. Furthermore, the lift range for the attached implement has been less than desired. The variation of types of implements that can be attached to such hitches is also undesirably limited. Furthermore, some of such hitches require the removal of the attached implement from the hitch or lowering of the hitch to remove the vehicle cargo box or platform to service the engine or other mechanical components located below the cargo box or platform.

The present inventors have recognized the desirability of providing a cart-type utility vehicle with a three point hitch assembly that is capable of full functionality without compromising the operability of the cart-type vehicle.

SUMMARY OF THE INVENTION

A three point hitch for a cart-type utility vehicle is provided that has enhanced operating capabilities and is easily assembled onto the cart-type utility vehicle.

The preferred embodiment of the invention is particularly suited for a cart-type utility vehicle having a pivotal cargo bed. The utility vehicle comprises a vehicle frame that includes lower frame portions and upper frame portions, the upper frame portions having a pivot connection arrangement for pivoting the cargo bed upward in a rearward direction. Pivot connectors mount the cargo bed on the vehicle frame.

The hitch includes a beam extending in a lateral direction. Two endplates are fixedly connected to respective end portions of the beam and are supported by the upper portions of the vehicle frame.

Two spaced apart lower draft links are each pivotally mounted to a respective lower frame portion and extend rearward. The lower draft links have connection features at free ends thereof for connecting to an implement.

A hydraulic cylinder is operatively braced at one end to the beam and operatively connected at another end to the pair of spaced apart lower draft links, expansion of the hydraulic cylinder pivoting the pair of spaced apart lower draft links upwardly. An upper link is pivotally connected to the beam and extends rearward, the upper link having a connection feature at a free end thereof for connection to an implement.

According to the embodiment, the beam endplates have holes therein for receiving the pivot connectors that mount the cargo bed to the vehicle frame. Thus, the hitch can at least in part be fastened to the frame using the common connection points used to mount the cargo bed.

The preferred embodiment of the invention provides a three point hitch for a utility vehicle wherein the utility vehicle comprises a vehicle frame including an axle housing and an upper frame cross member. The spaced apart lower draft links are each pivotally mounted to the axle housing and extending rearward. In this regard the lower draft links can be connected to the axle housing via a pair of lower base mounts, each lower base mount pivotally connected to a lower draft link.

The beam extends in a lateral direction parallel to the upper frame cross member. A rockshaft extends parallel to the beam and is pivotally connected to the beam along a length of the rockshaft. A lift bracket is fixedly connected to the rockshaft. Two upper links are fixedly connected to the rockshaft and extend rearward, the upper links located above the lower draft links. The endplates are fixedly connected to the beam and are pinned to the vehicle frame by two pins.

Preferably, the pins penetrate collars fixed to the vehicle frame and the two pins also penetrate journals that carry the vehicle cargo box or bed, allowing the cargo box or bed to be pivoted on the pins. A bracket assembly is configured to capture the upper frame cross member. The bracket assembly extends to a cylinder connection below the rockshaft. The hydraulic cylinder is connected at one end to the bracket assembly cylinder connection and at another end to the lift bracket. Expansion of the hydraulic cylinder rotates the rockshaft to lift ends of the upper links. Two vertical links connect the upper links and the lower draft links. Each of the vertical links can comprise a support chain that introduces some vertical float of the implement with respect to the vehicle frame.

The hitch can include a pair of bracing chains, each connected to one of the support brackets and to a respective opposite lower draft link at a position along a length of the lower draft link, the bracing chains crossing to form an X shape.

The lift bracket can comprise parallel plates each having an arcuate slot, the arcuate slots being in registry. The hydraulic cylinder can comprise a cross pin extending through both slots and being movable through the slots. The slots allow the lower draft links to be pivoted upwardly without the lift bracket exerting a significant force on the cross pin.

The three point hitch of the invention provides increased vertical float between the implement and the vehicle. The increased vertical float is provided at least in part by the chains located in the vertical link and the arcuate slots of the lift bracket. The three point hitch of the invention is easily installed on the vehicle at least in part by being pinned using common pins utilized for attaching the cargo box or platform, and being bolted via a capture arrangement to the upper frame cross member.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
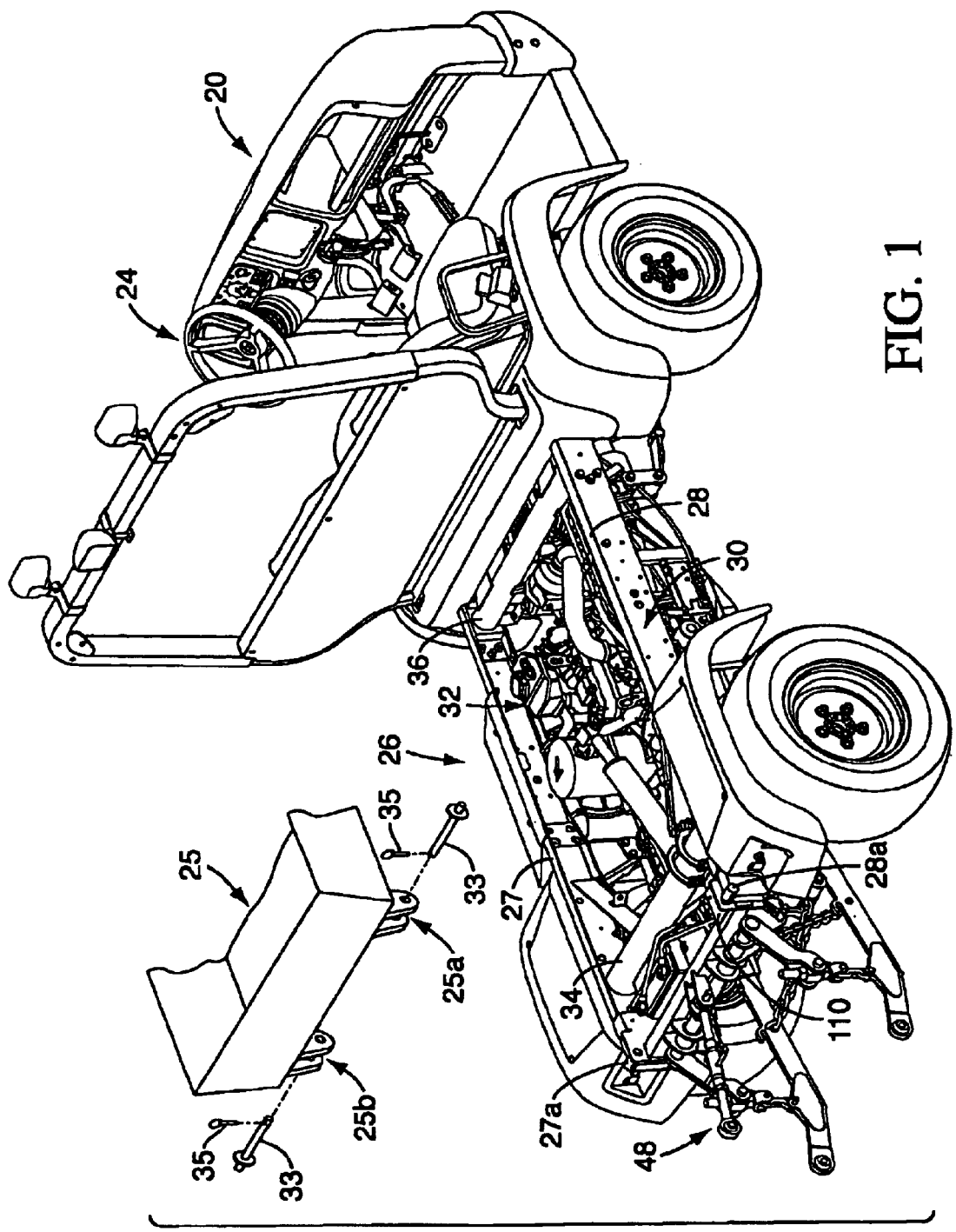
FIG. 1 is a perspective view of a cart-type utility vehicle incorporating a three point hitch of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a utility vehicle 20 including an operator's station 24 and cargo area 26. The cargo area typically includes a cargo bed in the form of a cargo box 25 or a cargo platform (not shown) supported on side rails 27, 28 of a vehicle frame 30. An engine 32 is located beneath the cargo area 26. A rear tubular beam 34 and a front tubular beam 36 connect to the rails 27, 28 to form a rectangular upper portion of the vehicle frame 30.

Figure 1A:
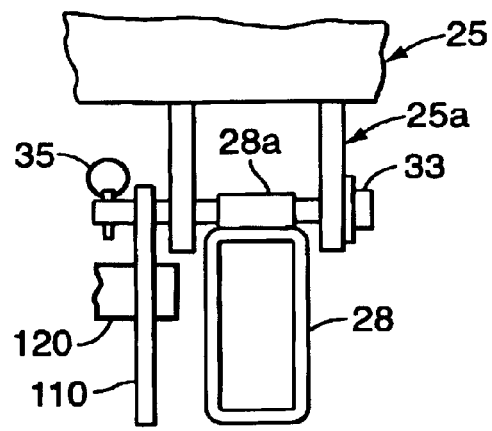
FIG. 1A is an enlarged fragmentary end view of the three point hitch of FIG. 1.

Tubular collars 27a, 28a are welded to top sides of the rails 27, 28. The cargo box 25 (or cargo platform) includes two pairs of lugs or journals 25a, 25b that straddle the collars 27a, 28a. Retaining pins 33 having release pins 35 are used to pivotally connect the cargo box 25 to the frame 30. A hitch assembly 48 is mounted to the vehicle frame 30 at a rear of the vehicle 20. FIG. 1A illustrates that the pin 33 is fit through the pair of lugs 25a, the collar 28a and an end plate 110 (described below) of the three point hitch. The release pin 35 is fit through a hole in the retaining pin 33 to secure the assembly. The cargo box 25 is pivotal on the pin 33. The cargo box 25 can be pivoted upward to service mechanical components below the cargo box.

Figure 2:
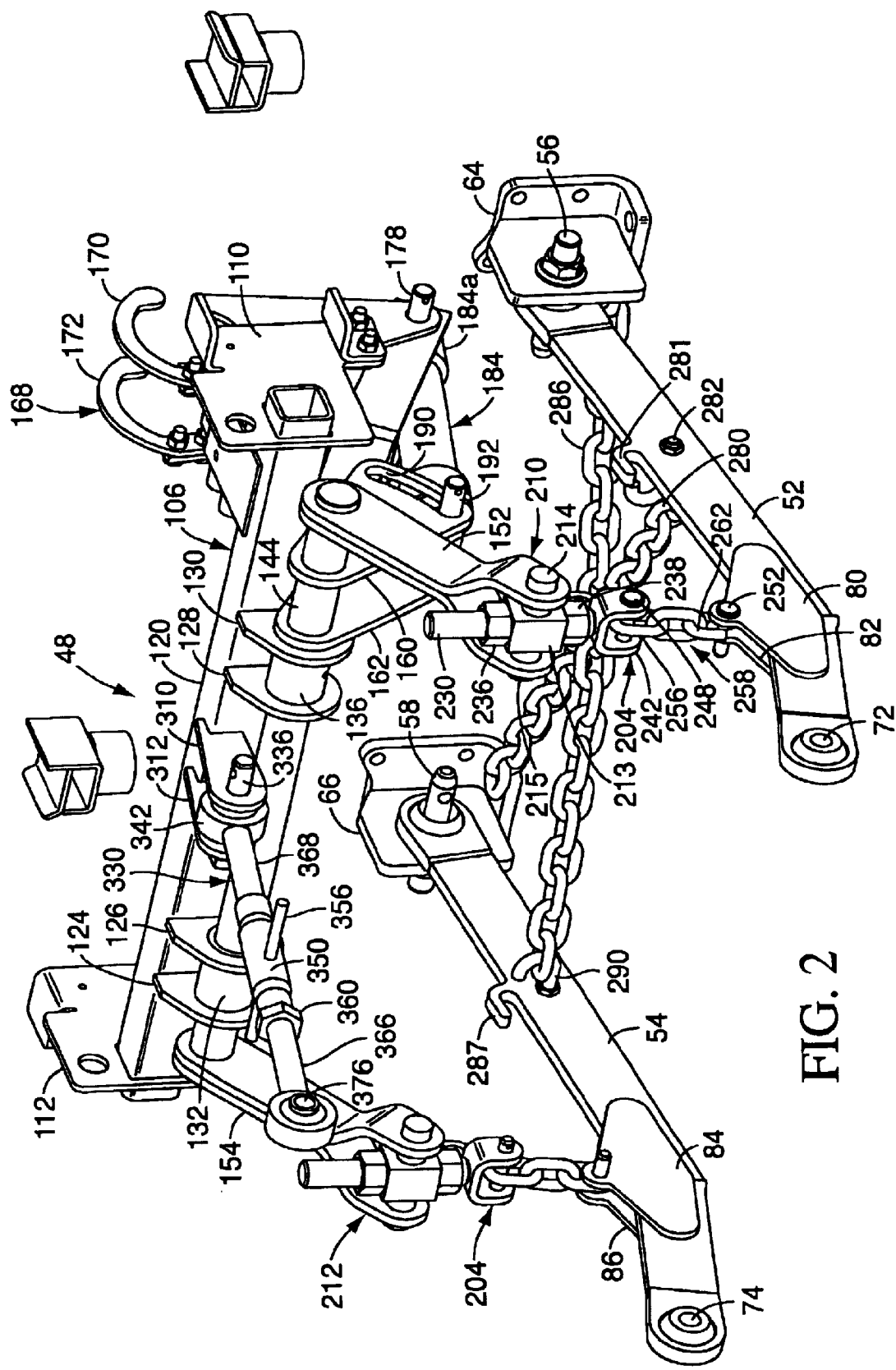
FIG. 2 is an enlarged perspective view of the three point hitch of FIG. 1.

FIG. 2 illustrates the hitch assembly 48 in detail. The assembly 48 includes bottom draft links 52, 54 that are pivotally connected by conventional means such as pivot pins or bolts 56, 58 to lower base mounts 64, 66. In this regard, conventional means can be used to maintain the position of the bolts or pivot pins, such as the use of nuts or the use of clip pins passing through holes in the ends of the pivot pins external to the mounts. The base mounts 64, 66 are fastened to lower portions of the vehicle frame 30 such as to a rear axle housing of the vehicle (not shown). The base mounts 64, 66 can be fastened to the rear axle housing using bolts through holes provided in the axle housing or by use of U-bolts, or other conventional connectors.

The bottom draft links 52, 54 include engagement bosses 72, 74 at ends thereof for connection by a pin or bolt to an implement (not shown). At a location between the base mounts 64, 66 and the bosses 72, 74 the draft links have clevis plate pairs 80, 82 and 84, 86 connected by welding or by other means thereto.

An upper mount 106 includes end plates 110, 112. A rectangular beam 120 is connected between the end plates 110, 112. A plurality of journal plates 124, 126, 128, 130 are fixed by welding, or connected by other means, to the beam 120. A sleeve bearing 132, 136 is fixed between each pair of journal plates 124, 126, 128, 130.

A rockshaft 144 extends through the bearings 132, 136. A pair of lift arms 152, 154 is fixed by welding or by other means to the rock shaft 144. Adjacent one lift arm 152, a pair of lift brackets 160, 162 is fixed by welding or by other means to the rockshaft 144.

A bracket assembly 168 includes a pair of bracket plates 170, 172 that extend downward to bottom ends where a bolt or pivot pin 178 penetrates through holes of the bracket plates 170, 172, the holes having a common axis. In this regard, conventional means can be used to maintain the position of the bolt or pivot pin, such as the use of a nut or the use of a clip pin passing through a hole in the end of the pivot pin external to the clamp bracket. A hydraulic cylinder 184 has a base fixture 184a with a hole at a base end of the cylinder 184 that is penetrated by the pin 178 to pivotally connect the cylinder 184 to the bracket plates 170, 172.

Figure 3A:
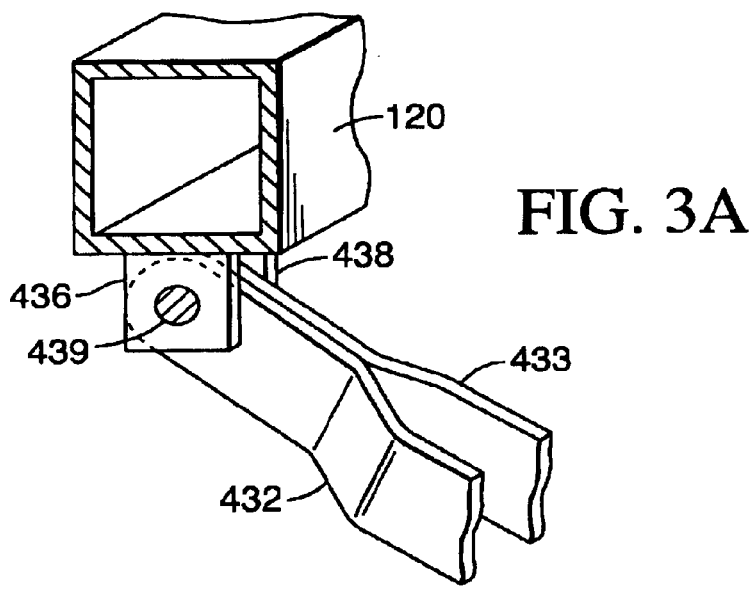
FIG. 3A is an enlarged fragmentary sectional view taken generally along line 3A—3A of FIG. 3.
Figure 3B:
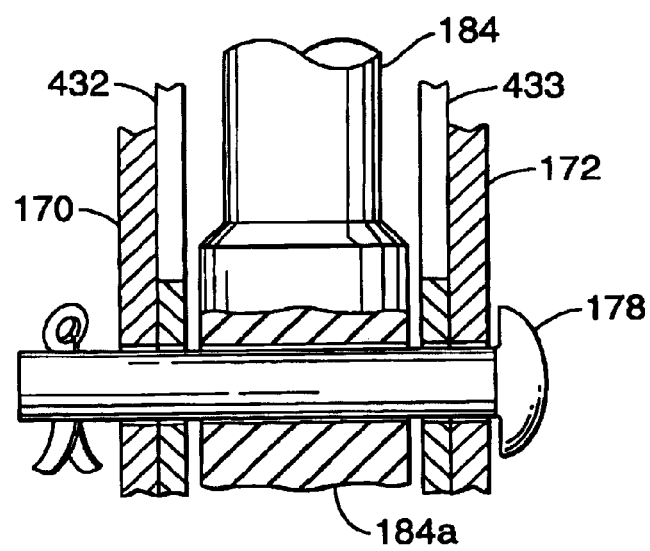
FIG. 3B is an enlarged fragmentary sectional view taken generally along line 3B—3B of FIG. 3.
Figure 3:
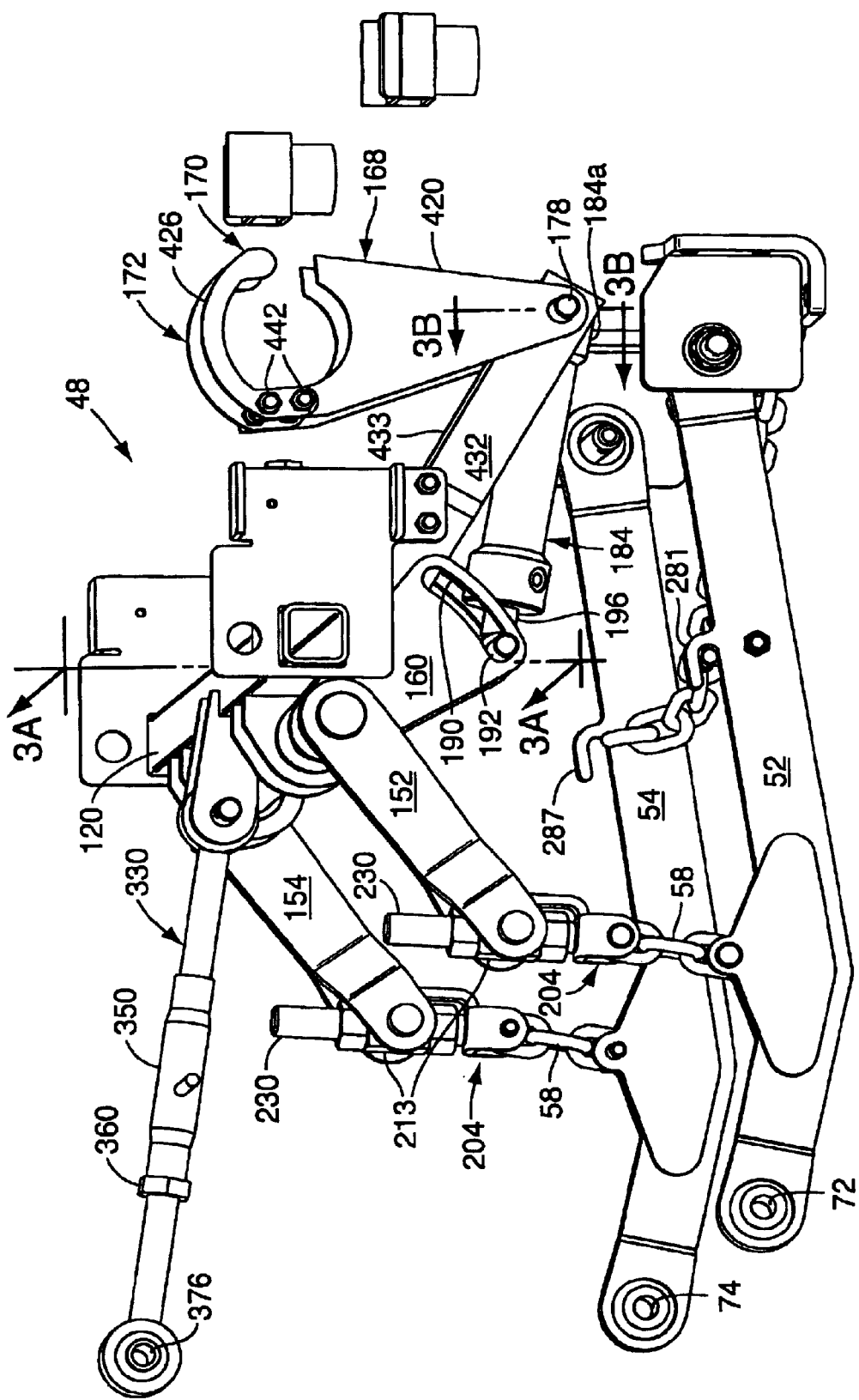
FIG. 3 is a side perspective view of the three point hitch of FIG. 2.

The lift brackets 160, 162 are identically configured and each include an arcuate slot 190 that receives a cross pin 192 that is fixed to an end of a rod 196 that extends from, or retracts into, a body 200 of the cylinder 184 (FIG. 3).

The lift arms 152, 154 are connected to the lower draft links 52, 54 in identical fashion by a vertical link 204. Each lift arm 152, 154 includes a clevis 210 at an end thereof. The vertical link 204 includes a block 213 having pins 214, 215 is fit into the clevis with the pins 214, 215 rotationally held by the clevis 210.

A threaded rod 230 penetrates through a vertical threaded bore within the block 213 and is fixed to the block by upper and lower nuts 236, 238 engaged to the rod 230. A lower clevis 242 is fixed by welding or by other means to the rod 230. The length of the vertical link 204 can be adjusted using the rod 230 and the upper and lower nuts 236, 238.

A bolt or pivot pin 248 passes through the clevis 242 and captures a link 256 of a chain 258. Another bolt or pivot pin 252 passes through the plates 80, 82 and captures a lower link 262 of the chain 258. In this regard, conventional means can be used to maintain the position of the bolts or pivot pins, such as the use of nuts or the use of clip pins passing through holes in the ends of the pivot pins external to the clevis. The vertical "play" in the chain provides a degree of vertical float between the implement and the vehicle.

A first chain 280 extends from the rear base mount 66 to an eyebolt 282 that is fastened to a mid portion of the draft link 52. A second chain 286 extends from the rear base mount 64 and to an identical eyebolt 290 fastened to a mid portion of the draft link 54. Alternately, the chains could be connected to hooks 281, 287 formed in the draft links 52, 54 adjacent to the respective eyebolts 282, 290, instead of directly to the eyebolts 282, 290. The adjacent eyebolts 282, 290 could then be utilized to hold slack excess chain length to prevent the chain end from dragging on the ground. The chains 280, 286 criss cross and provide lateral stability to the draft links 52, 54.

A pair of upper attachment plates 310, 312 is welded to the rectangular beam 120. An upper link 330 is rotationally captured between the plates 310, 312 by a bolt or pivot pin 336 that passes through holes in the plates 310, 312 and through a boss 342 at an end of the link 330. In this regard, conventional means can be used to maintain the position of the bolt or pivot pin, such as the use of nut or the use of a clip pin passing through a hole in the end of the pivot pin external to the plates. The link 330 includes a threaded ferule 350 having a turning handle 356 and a lock nut 360. The ferule 350 and lock nut 360 are engaged to threaded rod portions 366, 368 of the link. Turning of the ferule 350 lengthens or shortens the link 330.

The link 330 includes a connection boss 376 at its distal end for connection by a pin or bolt to an implement (not shown).

As shown in FIG. 3, the bracket plates 170, 172 each comprise two parts, a somewhat triangular base portion 420 and a strap portion 426. The bracket assembly 168 also includes angle braces 432, 433. The bolt or pin 178 penetrates not just the base portions 420 and the base fixture of the cylinder 184 but also the angle braces 432, 433 which are fastened at an opposite end to the rectangular tube 120. The angle braces 432, 433 and the bracket plates 170, 172 solidly fix a position of the base fixture 184a of the cylinder 184. As illustrated in FIG. 3A the braces 432, 433 are bent together and captured between two lugs 436, 438 that are welded to the beam 120. A pin or bolt 439 penetrates through the lugs 436, 438 and braces 436, 438 to fasten the braces 432, 433 to the beam 120. As illustrated in FIG. 3B the braces 432, 433 straddle the fixture 184a of the hydraulic cylinder 184 and are fit between the bracket plates 170, 172. The pin 178 pivotally fastens the bracket plates 170, 172, the braces 432, 433 and the base fixture 184a.

The base portions 420 are fit under the beam 34 of the frame 30 and the straps 426 are fit over the beam 34 and fastened to the base portion 420 using fasteners 442, to capture the beam 34.

To lift the lower links 52, 54, the cylinder 184 is pressurized to extend the rod. The rod, via the cross pin 192, forcibly rotates the plates 160, 162, clockwise in FIG. 3. Rotation of the plates 160, 162 rotates the rock shaft 144. The rock shaft 144 rotates the lift arms 152, 154 which lift the chains 258 which lift the draft links 52, 54.

The hitch arrangement is vertically adjustable at the rods 230 by loosening the nuts 236, 238, adjusting the portion of the rod 230 within the block 213 and re-tightening the nuts. The hitch arrangement is horizontally adjustable by loosening the lock nut 360, turning of the ferule 350, and then retightening the lock nut 360 against the ferule 350.

The hitch arrangement provides vertical float by the vertical flexibility of the chains 258 and by the rock shaft 144 rotation. The cross pin 192 can slide within the slot 190 without effecting force on the cylinder 184.

Figure 4:
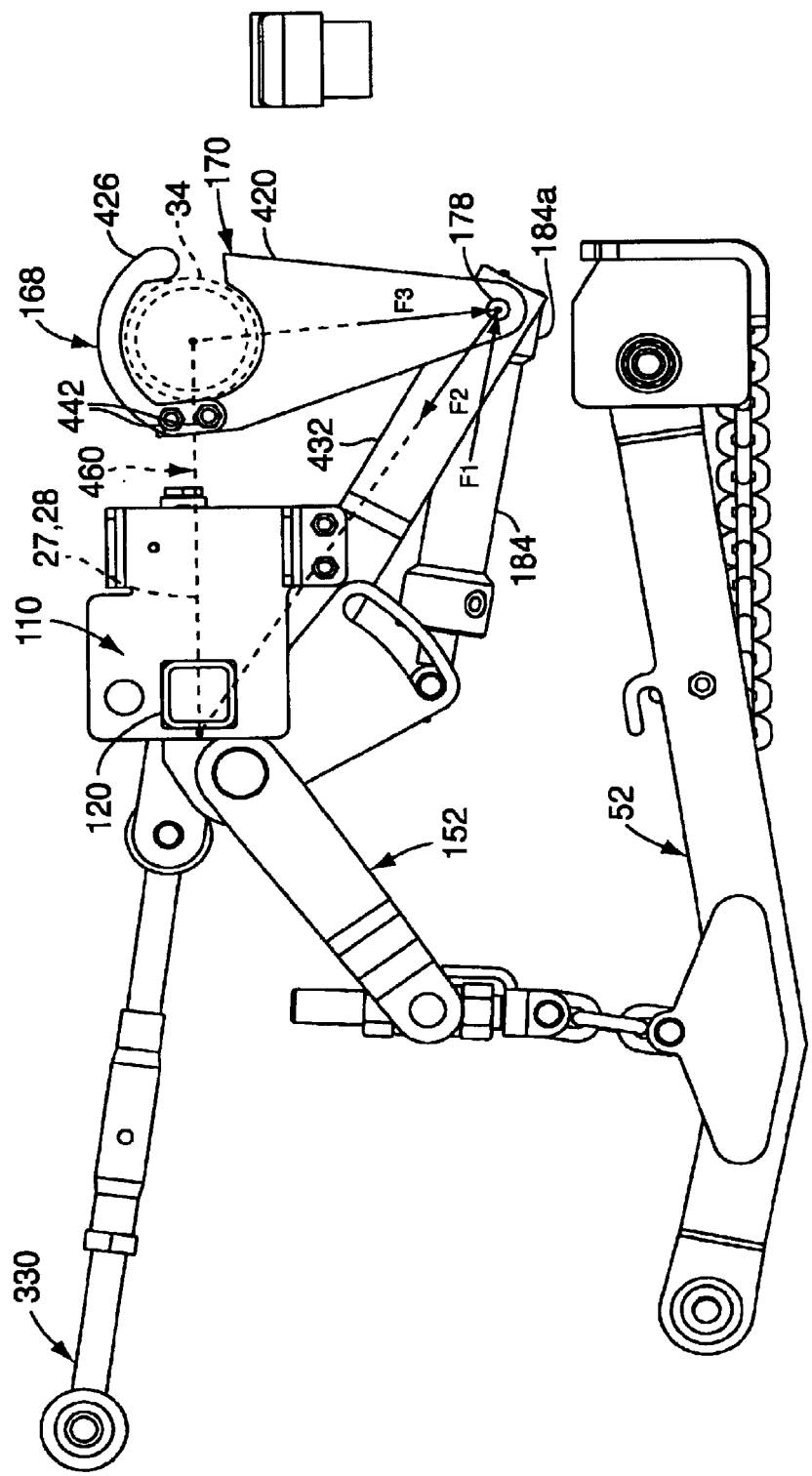
FIG. 4 is a side view of the three point hitch of FIG. 2.

FIG. 4 illustrates that a reaction force F1 caused by expansion of the cylinder 184 lifting the draft links 52, 54 is resisted by forces F2 and F3. The force F2 is transmitted through the braces 432, 433 to the beam 120. The force F3 is a downward force transmitted through the bracket plates 170, 172 to the rear tubular beam 34 of the vehicle frame 30. A triangular configuration 460 (shown dashed) made up of braces 432, 433, side rails 27, 28 (shown schematically as a dashed link) and brackets 170, 172 provide a rigid brace structure for the lift cylinder. The three point hitch assembly being pinned or fastened together, is easily assembled and disassembled but still provides a rigid structure.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A three point hitch arrangement for a utility vehicle comprising:

a pivotal cargo bed;

a vehicle frame that includes lower frame portions and upper frame portions, the upper frame portions having a pivot connection arrangement for pivoting the cargo bed upward in a rearward direction, said pivot connection arrangement having pivot connectors to mount the cargo bed on the vehicle frame;

a beam extending in a lateral direction;

a pair of endplates fixedly connected to end portions of said beam and supported by said upper portions of said vehicle frame, said endplates having features for engaging said pivot connectors that mount the cargo bed to the vehicle frame;

a pair of spaced apart lower draft links, each pivotally mounted to a respective lower frame portion and extending rearward, said lower draft links having connection features at free ends thereof for connecting to an implement;

a hydraulic cylinder operatively braced at one end to said beam and operatively connected at another end to said pair of spaced apart lower draft links, expansion of said hydraulic cylinder pivoting said pair of spaced apart lower draft links upwardly; and an upper link pivotally connected to said beam and extending rearward, said upper link having a connection feature at a free end thereof for connection to an implement.

2. The hitch arrangement according to claim 1, comprising:

a rockshaft extending parallel to said beam and pivotally connected to said beam at two places along a length of said rockshaft;

a lift bracket fixedly connected to said rockshaft;

a pair of upper links fixedly connected to said rockshaft and extending rearward, said upper links located above said lower draft links;

a bracket assembly configured to capture an upper frame portion, said bracket assembly extending to a cylinder connection below said rockshaft, said bracket assembly having a brace from said cylinder connection to said beam;

said hydraulic cylinder connected at one end to said bracket assembly cylinder connection and at another end to said lift bracket, expansion of said hydraulic cylinder rotating said rockshaft to lift ends of said upper links; and a pair of vertical links connected between said upper links and said lower draft links.

3. The hitch arranged according to claim 1, wherein said features comprise first holes and said pivot arrangement comprises second holes and wherein said pivot connectors comprise two pins, each pin inserted through one first hole and one second hole.

4. A three point hitch for a utility vehicle having a pivotal cargo bed, wherein the utility vehicle comprises a vehicle frame that includes lower frame portions and upper frame portions, the upper frame portions having a pivot connection arrangement for pivoting the cargo bed upward in a rearward direction that uses pivot connectors to mount the cargo bed on the vehicle frame, comprising:

a beam extending in a lateral direction;

a pair of end plates fixedly connected to end portions of said beam and supported by said upper portions of said vehicle frame, said endplates having holes therein for receiving said pivot connectors that mount the cargo bed to the vehicle frame;

a pair of spaced apart lower draft links, each pivotally mounted to a respective lower frame portion and extending rearward, said lower draft links having connection features at free ends thereof for connecting to an implement;

a hydraulic cylinder operatively braced at one end to said beam and operatively connected at another end to said pair of spaced apart lower draft links, expansion of said hydraulic cylinder pivoting said pair of spaced apart lower draft links upwardly;

an upper link pivotally connected to said beam and extending rearward, said upper link having a connection feature at a free end thereof for connection to an implement;

a rockshaft extending parallel to said beam and pivotally connected to said beam at two places along a length of said rockshaft;

a lift bracket fixedly connected to said rockshaft;

a pair of upper links fixedly connected to said rockshaft and extending rearward, said upper links located above said lower draft links;

a bracket assembly configured to capture an upper frame portion, said bracket assembly extending to a cylinder connection below said rockshaft, said bracket assembly having a brace from said cylinder connection to said beam;

said hydraulic cylinder connected at one end to said bracket assembly cylinder connection and at another end to said lift bracket, expansion of said hydraulic cylinder rotating said rockshaft to lift ends of said upper links;

a pair of vertical links connected between said upper links and said lower draft links; and wherein said lift bracket comprises a plate having an arcuate slot and said cylinder comprises a pin, said cylinder connected to said lift bracket by said pin movable within said slot.

5. A three point hitch for a utility vehicle having a pivotal cargo bed, wherein the utility vehicle comprises a vehicle frame that includes lower frame portions and upper frame portions, the upper frame portions having a pivot connection arrangement for pivoting the cargo bed upward in a rearward direction that uses pivot connectors to mount the cargo bed on the vehicle frame, comprising:

a beam extending in a lateral direction;

a pair of endplates fixedly connected to end portions of said beam and supported by said upper portions of said vehicle frame, said endplates having holes therein for receiving said pivot connectors that mount the cargo bed to the vehicle frame;

a pair of spaced apart lower draft links, each pivotally mounted to a respective lower frame portion and extending rearward, said lower draft links having connection features at free ends thereof for connecting to an implement;

a hydraulic cylinder operatively braced at one end to said beam and operatively connected at another end to said pair of spaced apart lower draft links, expansion of said hydraulic cylinder pivoting said pair of spaced apart lower draft links upwardly;

an upper link pivotally connected to said beam and extending rearward, said upper link having a connection feature at a free end thereof for connection to an implement;

a rocks haft extending parallel to said beam and pivotally connected to said beam at two places alone a length of said rockshaft;

a lift bracket fixedly connected to said rockshaft;

a pair of upper links fixedly connected to said rockshaft and extending rearward, said upper links located above said lower draft links;

a bracket assembly configured to capture an upper frame portion, said bracket assembly extending to a cylinder connection below said rockshaft, said bracket assembly having a brace from said cylinder connection to said beam;

said hydraulic cylinder connected at one end to said bracket assembly cylinder connection and at another end to said lift bracket, expansion of said hydraulic cylinder rotating said rockshaft to lift ends of said upper links;

a pair of vertical links connected between said upper links and said lower draft links; and wherein said lift bracket comprises parallel plates each having an arcuate slot, said arcuate slots in registry, and said cylinder comprises a cross pin extending through both said arcuate slots and being movable through said slots, said slots allowing said lower draft links to be pivoted upwardly without the lift bracket exerting a significant force on the cross pin.

6. A three point hitch for a utility vehicle having a pivotal cargo bed, wherein the utility vehicle comprises a vehicle frame that includes lower frame portions and upper frame portions, the upper frame portions having a pivot connection arrangement for pivoting the cargo bed upward in a rearward direction that uses pivot connectors to mount the cargo bed on the vehicle frame, comprising:

a beam extending in a lateral direction;

a pair of endplates fixedly connected to end portions of said beam and supported by said upper portions of said vehicle frame, said endplates having holes therein for receiving said pivot connectors that mount the cargo bed to the vehicle frame;

a pair of spaced apart lower draft links, each pivotally mounted to a respective lower frame portion and extending rearward, said lower draft links having connection features at free ends thereof for connecting to an implement;

a hydraulic cylinder operatively braced at one end to said beam and operatively connected at another end to said pair of spaced apart lower draft links, expansion of said hydraulic cylinder pivoting said pair of spaced apart lower draft links upwardly;

an upper link pivotally connected to said beam and extending rearward, said upper link having a connection feature at a free end thereof for connection to an implement;

a rockshaft extending parallel to said beam and pivotally connected to said beam at two places along a length of said rockshaft;

a lift bracket fixedly connected to said rockshaft;

a pair of upper links fixedly connected to said rockshaft and extending rearward, said upper links located above said lower draft links;

a bracket assembly configured to capture an upper frame portion, said bracket assembly extending to a cylinder connection below said rockshaft, said bracket assembly having a brace from said cylinder connection to said beam;

said hydraulic cylinder connected at one end to said bracket assembly cylinder connection and at another end to said lift bracket, expansion of said hydraulic cylinder rotating said rockshaft to lift ends of said upper links;

a pair of vertical links connected between said upper links and said lower draft links; and wherein said lift bracket comprises parallel plates each having an arcuate slot, said arcuate slots in registry, and said cylinder comprises a cross pin extending through both said arcuate slots and being movable through said slots, said slots allowing said lower draft links to be pivoted upwardly without the lift bracket exerting a significant force on the cross pin.

7. A three point hitch for a utility vehicle having a pivotal cargo bed, wherein the utility vehicle comprises a vehicle frame that includes lower frame portions and upper frame portions, the upper frame portions having a pivot connection arrangement for pivoting the cargo bed upward in a rearward direction that uses pivot connectors to mount the cargo bed on the vehicle frame, comprising:

a beam extending in a lateral direction;

a pair of endplates fixedly connected to end portions of said beam and supported by said upper portions of said vehicle frame, said endplates having holes therein for receiving said pivot connectors that mount the cargo bed to the vehicle frame;

a pair of spaced apart lower draft links, each pivotally mounted to a respective lower frame portion and extending rearward, said lower draft links having connection features at free ends thereof for connecting to an implement;

a hydraulic cylinder operatively braced at one end to said beam and operatively connected at another end to said pair of spaced apart lower draft links, expansion of said hydraulic cylinder pivoting said pair of spaced apart lower draft links upwardly;

an upper link pivotally connected to said beam and extending rearward, said upper link having a connection feature at a free end thereof for connection to an implement;

a rockshaft extending parallel to said beam and pivotally connected to said beam at two places along a length of said rockshaft;

a lift bracket fixedly connected to said rockshaft;

a pair of upper links fixedly connected to said rockshaft and extending rearward, said upper links located above said lower draft links;

a bracket assembly configured to capture an upper frame portion, said bracket assembly extending to a cylinder connection below said rockshaft, said bracket assembly having a brace from said cylinder connection to said beam;

said hydraulic cylinder connected at one end to said bracket assembly cylinder connection and at another end to said lift bracket, expansion of said hydraulic cylinder rotating said rockshaft to lift ends of said upper links;

a pair of vertical links connected between said upper links and said lower draft links; and wherein each said vertical link comprises a chain, and wherein said lift bracket comprises a plate having an arcuate slot and said cylinder comprises a pin, said cylinder connected to said lift bracket by said pin movable within said slot.

8. A three point hitch for a utility vehicle wherein said utility vehicle comprises a vehicle frame that includes lower frame portions and upper frame portions, comprising:

a pair of spaced apart lower draft links, each pivotally mounted to a respective lower frame portion and extending rearward, said lower draft links having connection features at free ends thereof for connecting to an implement;

a beam extending in a lateral direction and supported on opposite ends by first and second upper frame portions;

a rockshaft extending parallel to said beam and pivotally connected to said beam along a length of said rockshaft;

a lift bracket fixedly connected to said rockshaft;

a pair of upper links fixedly connected to said rockshaft and extending rearward, said upper links located above said lower draft links;

a bracket assembly having a plate connected to a third upper frame portion, said plate extending downward to a first cylinder connection below said rockshaft, said bracket assembly including an angle brace that is connected at one end to said plate at said first cylinder connection and at an opposite end to said beam, said brace rising rearwardly at an oblique angle from said first cylinder connection to said beam;

a hydraulic cylinder connected at one end to said first cylinder connection and at another end to a second cylinder connection at said lift bracket, expansion of said hydraulic cylinder rotating said lift bracket and said rockshaft to lift ends of said upper links;

a pair of vertical links connected between said upper links and said lower draft links; and an upper link pivotally connected to said beam and extending rearward, said upper link having a connection feature at a free end thereof for connection to an implement.

9. The hitch according to claim 8, wherein said first and second upper frame portions comprise connections for mounting a pivotal cargo bed, and wherein said hitch comprises a pair of endplates fixedly connected to said opposite ends of said beam, said endplates having holes that register with said connections such that said beam and a cargo bed can be mounted using common pins.

10. The hitch according to claim 8, wherein said vehicle comprises a rear axle housing and said hitch comprises a pair of lower base mounts, each pivotally connected to a lower draft link and configured to be fixedly connected to said axle housing.

11. A three point hitch for a utility vehicle wherein said utility vehicle comprises a vehicle frame that includes lower frame portions and upper frame portions, comprising:
a pair of spaced apart lower draft links, each pivotally mounted to a respective lower frame portion and extending rearward, said lower draft links having connection features at free ends thereof for connecting to an implement;
a beam extending in a lateral direction and supported on opposite ends by first and second upper frame portions;
a rockshaft extending parallel to said beam and pivotally connected to said bean along a length of said rockshaft;
a lift bracket fixedly connected to said rockshaft;
a pair of upper links fixedly connected to said rockshaft and extending rearward, said upper links located above said lower draft links;
a bracket assembly having a plate connected to a third upper frame portion, said plate extending downward to a cylinder connection below said rockshaft, said bracket assembly including a brace that is connected at one end to said plate at said cylinder connection and at an opposite end to said beam;
a hydraulic cylinder connected at one end to said bracket assembly cylinder connection and at another end to said lift bracket, expansion of said hydraulic cylinder rotating said rockshaft to lift ends of said upper links;
a pair of vertical links connected between said upper links and said lower draft links;
an upper link pivotally connected to said beam and extending rearward, said upper link having a connection feature at a free end thereof for connection to an implement; and
wherein each said vertical link comprises a chain.

12. A three point hitch for a utility vehicle wherein said utility vehicle comprises a vehicle frame that includes lower frame portions and upper frame portions, comprising:
a pair of spaced apart lower draft links, each pivotally mounted to a respective lower frame portion and extending rearward, said lower draft links having connection features at free ends thereof for connecting to an implement;
a beam extending in a lateral direction and supported on opposite ends by first and second upper frame portions;
a rockshaft extending parallel to said beam and pivotally connected to said beam along a length of said rockshaft;
a lift bracket fixedly connected to said rockshaft;
a pair of upper links fixedly connected to said rockshaft and extending rearward, said upper links Located above said lower draft links;
a bracket assembly having a plate connected to a third upper frame portion, said plate extending downward to a cylinder connection below said rockshaft, said bracket assembly including a brace that is connected at one end to said plate at said cylinder connection and at an opposite end to said beam;
a hydraulic cylinder connected at one end to said bracket assembly cylinder connection and at another end to said lift bracket, expansion of said hydraulic cylinder rotating said rockshaft to lift ends of said upper links;
a pair of vertical links connected between said upper links and said lower draft links;
an upper link pivotally connected to said beam and extending rearward, said upper link having a connection feature at a free end thereof for connection to an implement; and
wherein said lift bracket comprises a plate having an arcuate slot and said cylinder comprises a pin, said cylinder connected to said lift bracket by said pin movable within said slot.

13. A three point hitch for a utility vehicle wherein said utility vehicle comprises a vehicle frame that includes lower frame portions and upper frame portions, comprising:
a pair of spaced apart lower draft links, each pivotally mounted to a respective lower frame portion and extending rearward, said lower draft links having connection features at free ends thereof for connecting to an implement;
a beam extending in a lateral direction and supported on opposite ends by first and second upper frame portions;
a rockshaft extending parallel to said beam and pivotally connected to said beam along a length of said rockshaft;
a lift bracket fixedly connected to said rockshaft;
a pair of upper links fixedly connected to said rockshaft and extending rearward, said upper links located above said lower draft links;
a bracket assembly having a plate connected to a third upper frame portion, said plate extending downward to a cylinder connection below said rockshaft, said bracket assembly including a brace that is connected at one end to said plate at said cylinder connection and at an opposite end to said beam;
a hydraulic cylinder connected at one end to said bracket assembly cylinder connection and at another end to said lift bracket, expansion of said hydraulic cylinder rotating said rockshaft to lift ends of said upper links;
a pair of vertical links connected between said upper links and said lower draft links;
an upper link pivotally connected to said beam and extending rearward, said upper link having a connection feature at a free end thereof for connection to an implement; and
wherein said lift bracket comprises parallel plates each having an arcuate slot, said arcuate slots in registry, and said cylinder comprises a cross pin extending through both said arcuate slots and being movable through said slots, said slots allowing said lower draft links to be pivoted upwardly without the lift bracket exerting a significant force on the cross pin.

14. A three point hitch for a utility vehicle wherein said utility vehicle comprises a vehicle frame, comprising:
a pair of spaced apart lower draft links, each pivotally mounted to the vehicle frame and extending rearward, said lower draft links having connection features at free ends thereof for connecting to an implement;
a rockshaft extending in a lateral direction and rotationally supported by the vehicle frame;
a lift bracket fixedly connected to said rockshaft;
a pair of upper links fixedly connected to said rockshaft and extending rearward, said upper links located above said lower draft links;
a hydraulic cylinder operatively connected at one end to said vehicle frame and at another end to said lift bracket, expansion of said hydraulic cylinder rotating said rockshaft to lift ends of said upper links;

a pair of vertical links connected between said upper links and said lower draft links, said vertical links comprising support chains that allow some vertical upward float of said lower draft links; and an upper link pivotally connected to said beam and extending rearward, said upper link having a connection feature at a free end thereof for connection to an implement.

15. The hitch according to claim 14, wherein said vehicle frame comprises first and second upper frame portions that comprise connections for mounting a pivotal cargo bed, and wherein said hitch comprises a beam and a pair of endplates fixedly connected to said opposite ends of said beam, said rockshaft rotationally supported on said beam, said endplates having holes that register with said connections such that said beam and a cargo bed can be mounted using common pins.

16. The hitch according to claim 14, wherein said vehicle comprises a rear axle housing and said hitch comprises a pair of lower base mounts, each pivotally connected to a lower draft link and configured to be fixedly connected to said axle housing.

17. The hitch according to claim 14, wherein said lift bracket comprises a plate having an arcuate slot and said cylinder comprises a pin, said cylinder connected to said lift bracket by said pin movable within said slot.

18. The hitch according to claim 14, wherein said lift bracket comprises parallel plates each having an arcuate slot, said arcuate slots in registry, and said cylinder comprises a cross pin extending through both said arcuate slots and being movable through said slots, said slots allowing said lower draft links to be pivoted upwardly without the lift bracket exerting a significant force on the cross pin.

19. The hitch according to claim 14, wherein said vehicle frame comprises first and second upper frame portions that comprise connections for mounting a pivotal cargo bed, and wherein said hitch comprises a beam and a pair of endplates fixedly connected to said opposite ends of said beam, said rockshaft rotationally supported on said beam, said endplates having holes that register with said connections such that said beam and a cargo bed can be mounted using common pins; and wherein said vehicle comprises a rear axle housing and said hitch comprises a pair of lower base mounts, each pivotally connected to a lower draft link and configured to be fixedly connected to said axle housing.

20. The hitch according to claim 19, wherein said lift bracket comprises a plate having an arcuate slot and said cylinder comprises a pin, said cylinder connected to said lift bracket by said pin movable within said slot.

* * * * *

UNITED STATES PATENT AND TRADEMARK OFFICE
CERTIFICATE OF CORRECTION

| | |
|---|---|
| PATENT NO. | : 6,915,862 B2 |
| APPLICATION NO. | : 10/389237 |
| DATED | : July 12, 2005 |
| INVENTOR(S) | : Thomas J. Deves et al. |

It is certified that error appears in the above-identified patent and that said Letters Patent is hereby corrected as shown below:

At column 8, line 23, change "rocks haft" to --rockshaft--.
At column 8, line 24, change "alone" to --along--.
At column 11, line 52, change "Located" to --located--.

Signed and Sealed this

Twenty-sixth Day of September, 2006

JON W. DUDAS
*Director of the United States Patent and Trademark Office*